H. F. BELDEN.
AUTOMOBILE WHEEL.
APPLICATION FILED DEC. 21, 1915. RENEWED APR. 29, 1918.
1,284,217.
Patented Nov. 12, 1918.
2 SHEETS—SHEET 2.
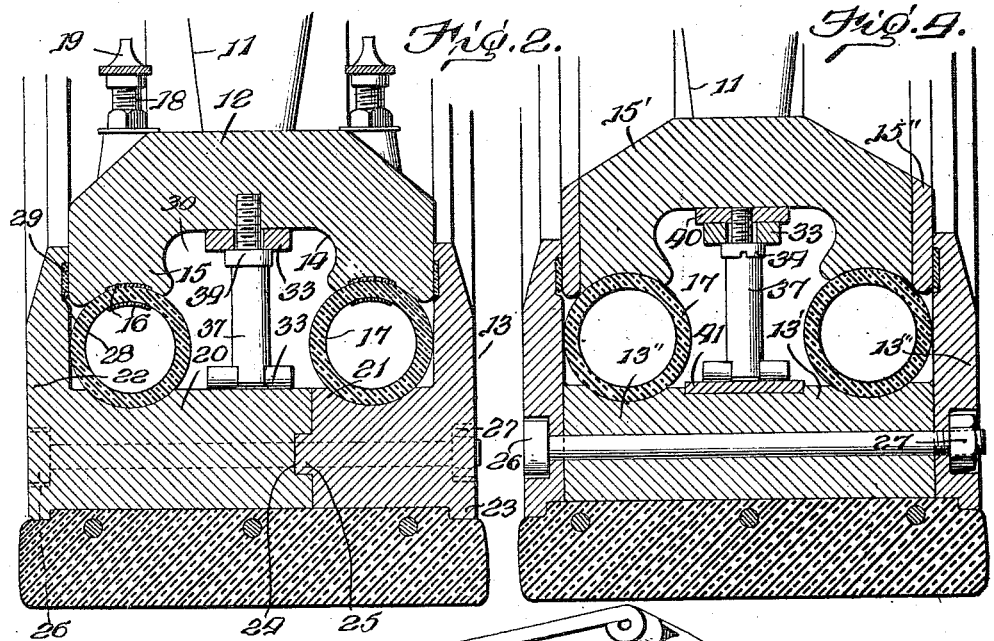
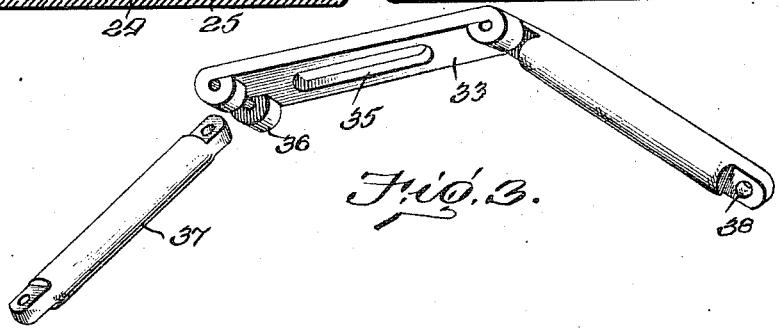
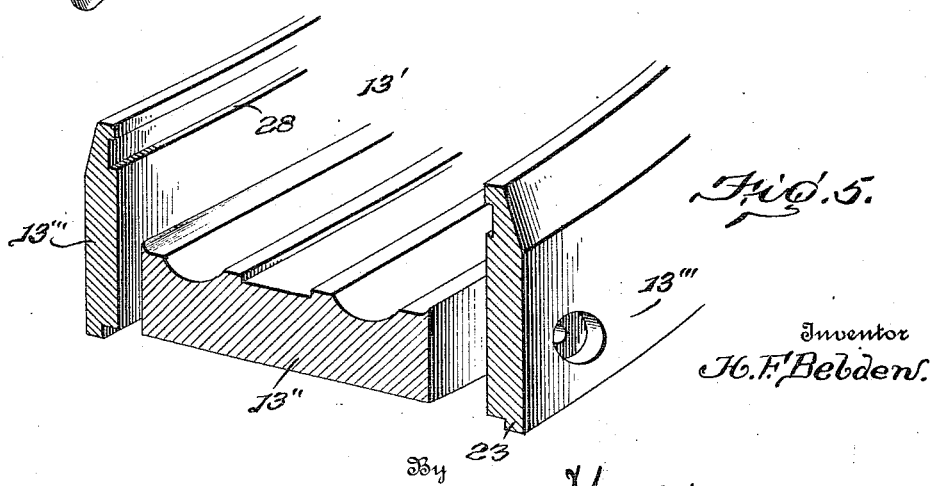
Inventor
H. F. Belden.

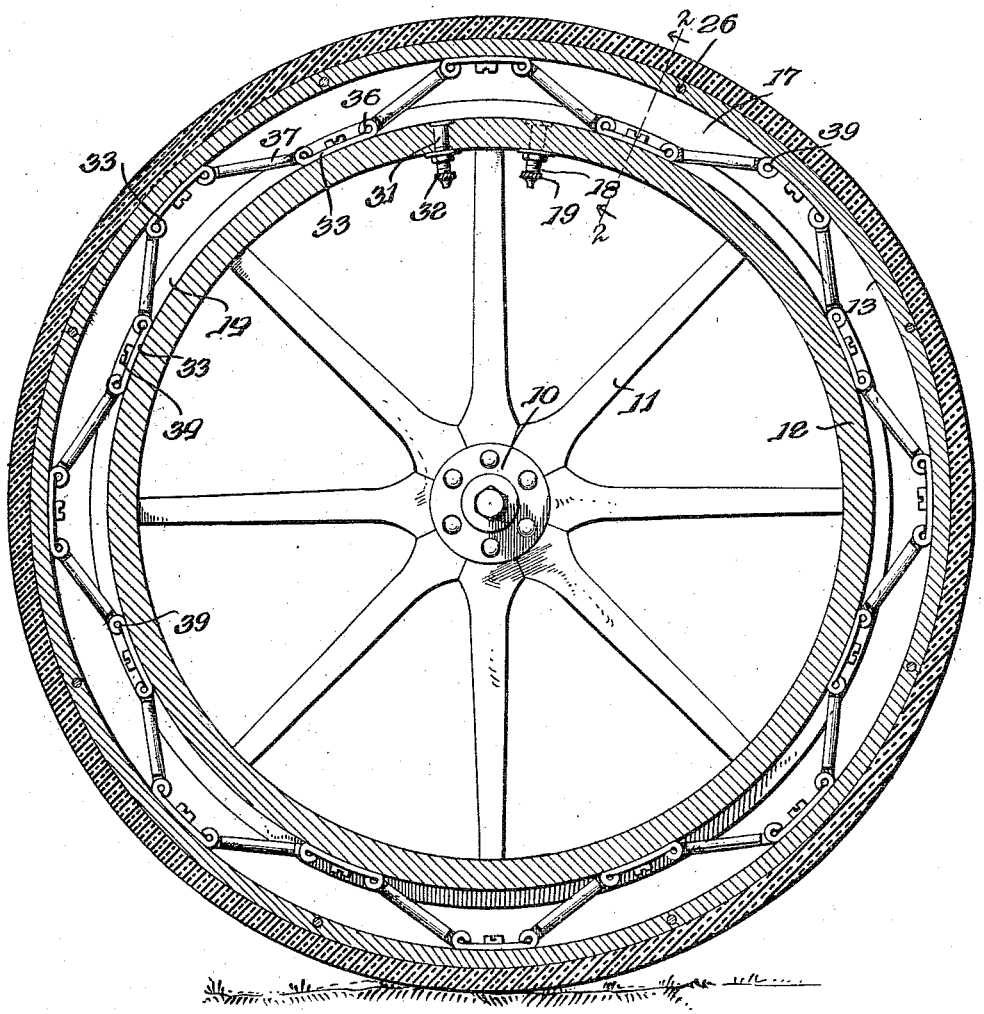

UNITED STATES PATENT OFFICE.

HERBERT F. BELDEN, OF DETROIT, MICHIGAN.

AUTOMOBILE-WHEEL.

1,284,217.   Specification of Letters Patent.   Patented Nov. 12, 1918.

Application filed December 21, 1915, Serial No. 68,047. Renewed April 29, 1918. Serial No. 231,541.

*To all whom it may concern:*

Be it known that I, HERBERT F. BELDEN, a citizen of the United States, residing at Detroit, in the county of Wayne and State of Michigan, have invented certain new and useful Improvements in Automobile-Wheels, of which the following is a specification.

My invention relates to new and useful improvements in wheels for motor vehicles and more particularly in the felly and rim construction of such wheels, the primary object of my invention being the provision of a felly and rim construction for wheels employing solid rubber treads, wherein provision is made for housing pneumatic tubes or tires between the felly and rim.

A still further object of my invention consists in constructing the outer face of the felly in such a manner as to effectively receive and be supported by the pneumatic tubes inclosed between it and the rim.

Another object which I have in mind is the provision of a simple form of sectional rim which may be readily taken apart or assembled and which, when in place, will form with the felly a fluid tight chamber for the pneumatic tubes.

And a still further object of my invention is the provision of a connecting means between the felly and rim which will in no way interfere with the necessary relative movement of the tube to afford the requisite cushioning action, but which will prevent creeping of the rim about the felly and which will, therefore, permit the employment of wheels of the character described as drive wheels.

With these and other objects in view, my invention will be more fully described, illustrated in the accompanying drawings, and then specifically pointed out in the claims which are attached to and form a part of this application.

In the drawings:

Figure 1 is a vertical sectional view through the rim and felly, showing the hub and spokes in elevation and illustrating the connection between the rim and felly;

Fig. 2 is a sectional view taken on the line 2—2 of Fig. 1, showing the rim and felly in cross section;

Fig. 3 is a detail perspective view of certain of the links employed in connecting the rim and felly;

Fig. 4 is a view corresponding to Fig. 2, illustrating a somewhat modified form of construction;

Fig. 5 is a fragmentary perspective view of the sections making up my improved rim.

Corresponding and like parts are referred to in the following description and indicated in all the views of the drawings by the same reference characters.

My improved wheel construction, as best shown in Fig. 1 of the drawings, includes a hub 10 of any suitable type, spokes 11 rigidly secured to the hub and extending radially therefrom, a felly 12 secured to the outer ends of the spokes in any well known or suitable manner, and a rim indicated as a whole by the numeral 13 surrounding the felly and spaced therefrom. The felly is preferably formed of some light metal, such as aluminum, although it may be made of wood or any other material found suitable and has in its outer face and centrally thereof a peripheral groove or channel 14 defining at either side abutment shoulders 15, the peripheral faces of which are grooved, as shown at 16, in order to snugly seat and be engaged by the pneumatic tubes or tires 17. These tubes or tires may be smaller than the ordinary pneumatic tubes as two are employed in each wheel and as they are not exposed to direct engagement with the road bed may be of much lighter weight and material. Preferably, they are formed of canvas or other fabric impregnated and coated with rubber or a rubber composition. Each tube is, of course, provided with the customary valve stem 18 which extends through the felly and incloses a check valve of the usual type protected, when not in use, by a dust cap 19.

The rim 13 is of such internal diameter as to engage the outer peripheral faces of the pneumatic tubes 17, as shown in Fig. 2, being grooved peripherally to receive them, and consists of two sections 20 and 21. Each of these sections, at its outer edge, is provided with an inwardly directed circumferential flange 22, the inner faces of which engage against the outer edges or faces of the felly 12 and each rim section, at its outer edge, is provided with an outwardly directed peripheral retaining shoulder 23. The inner edge of one of these rim sections, in the present instance the section 20, is provided with a circumferential groove or channel 24 to receive a circumferential rib or shoulder 25 formed upon the inner edge of the other section 21. The two rim sections, when applied to the wheel, are secured to each other and, consequently, against disengagement from the felly by a plurality of tie bolts 26 passed transversely through the body portions of the rim sections and provided with clamping nuts 27. As clearly shown in Fig. 2 of the drawings, the outer faces of the rim sections are recessed to receive the heads of the bolts and the nuts in order that they need not project beyond the sides of the rim and be exposed to injury. The inner faces of the felly engaging flanges 22 of the rim sections, adjacent their inner edges, are formed with circumferential grooves 28 to seat packing rings 29 of rubber or other equivalent material in order to provide a fluid tight chamber 30 between the felly and rim. As shown in Fig. 1 of the drawings, a valve stem 31 leads from this chamber and is provided with an air valve of the usual type and with a dust cap 32. By this means, air may be forced into the chamber 30 to a pressure substantially equal to that in the pneumatic tubes 17 and it will, therefore, be clear that this air, exerting pressure against the outer faces of the tubes, will relieve them of a portion of the strain from the air imprisoned in them.

The above described structure constitues my improved wheel as used for non-driving purposes. When the wheel is to be employed as a drive wheel upon a motor vehicle it of course becomes necessary to provide some type of connection between the felly and rim in order that the two may not turn independently of each other. In Figs. 1 to 3 inclusive of the drawings I have illustrated a preferred form of such connection. This connection, broadly speaking, comprehends a chain made up of alternate plates and links, the alternate plates having sliding connection with the felly and rim. As shown in Fig. 1 of the drawings, a plurality of plates 33 are secured in suitable spaced relation about the felly by bolts 34 threaded into the felly, these plates lying in the central channel 14 of the felly and being provided with longitudinal slots 35 to receive the bolts in order that the plates may have limited movement along the felly. The ends of the plates are slotted and rebent to provide hinge ears 36 for connection with the links. Other plates 33 are secured in spaced relation along the inner face of the rim section 20 which, as shown, is of greater width than the rim section 21 in order that the plates may be secured between the tubes, as shown in Fig. 2. The plates 33 of the rim are staggered with respect to the plates 33 of the felly in order that the ends of each plate of the felly may be linked to adjacent ends of plates on the rim.

The links 37 are preferably circular in cross section and provided with flattened perforated terminals 38 to seat between the hinge ears 36 of the plates to which they are connected by pivot or pintle pins 39.

It is believed that the foregoing explanation, when taken in connection with the drawings, will not only disclose the construction, but also the operation of my wheel and that any further description is, therefore, unnecessary. It will of course be understood that I do not wish to limit myself to the specific details illustrated and described as many changes may be made without departing from the spirit of my invention. For instance, in Figs. 4 and 5 of the drawings, I have illustrated a somewhat modified form of construction in which the felly 15′ is constructed of wood with its side faces incased in and reinforced by steel bands 15″ and in which the rim 13′ is constructed in three instead of two sections. This rim includes the rim proper 13″ which engages against the pneumatic tubes and the felly engaging flanges 13‴ which are secured to the edges of the rim proper by bolts 26 and nuts 27 and which are formed with the thread retaining shoulders 23. In this form of my invention, the body portion 13″ of the rim is also of wood, although the flanges 13‴ are of metal. In addition to the above distinctions, I provide the felly and rim with anchoring rings 40 and 41 to receive the bolts 34 which secure the plates 33, these rings being fastened to the rim and felly in any suitable manner. With the above exceptions, the construction disclosed in Figs. 4 and 5 is identical with that previously described.

Having thus described the invention, what is claimed as new is:

1. In a wheel construction, a felly, a rim, cushioning means between the rim and felly, and connecting means between the felly and rim preventing turning of one with respect to the other while permitting movement of one toward the other, said means including a chain construction, certain links having sliding connection with the rim and certain others with the felly.

2. In a wheel construction, a felly, a rim surrounding and spaced from the outer peripheral face of the felly, cushioning means between the rim and felly, and connecting means between the felly and rim, said connecting means including plates having limited sliding engagement with the felly, plates having limited sliding engagement with the rim, and links pivotally connecting the ends of the first plates with the adjacent ends of the second plates.

In testimony whereof, I affix my signature.

HERBERT F. BELDEN, [L. S.]